(12) United States Patent
Rahardjo et al.

(10) Patent No.: US 10,778,650 B2
(45) Date of Patent: Sep. 15, 2020

(54) SYSTEMS AND METHODS FOR MANAGEMENT DOMAIN ATTESTATION SERVICE

(71) Applicant: Dell Products L.P., Round Rock, TX (US)

(72) Inventors: Johan Rahardjo, Austin, TX (US); Mukund P. Khatri, Austin, TX (US); Michael J. Stumpf, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 15/239,195

(22) Filed: Aug. 17, 2016

(65) Prior Publication Data
US 2018/0054422 A1 Feb. 22, 2018

(51) Int. Cl.
| | |
|---|---|
| *H04L 29/06* | (2006.01) |
| *H04L 29/08* | (2006.01) |
| *H04L 12/24* | (2006.01) |
| *H04L 9/32* | (2006.01) |
| *H04L 9/08* | (2006.01) |

(52) U.S. Cl.
CPC ........ *H04L 63/0428* (2013.01); *H04L 9/0877* (2013.01); *H04L 9/3234* (2013.01); *H04L 41/28* (2013.01); *H04L 63/102* (2013.01); *H04L 67/306* (2013.01)

(58) Field of Classification Search
CPC ....... H04L 63/0428; H04L 63/14; H04L 9/30; H04L 9/32; H04L 41/28; H04L 63/10
See application file for complete search history.

(56) References Cited

U.S. PATENT DOCUMENTS

| | | | | |
|---|---|---|---|---|
| 7,137,139 | B1* | 11/2006 | Smith | H04L 41/0253 726/3 |
| 7,440,962 | B1* | 10/2008 | Wong | G06F 21/6218 |
| 7,506,357 | B1* | 3/2009 | Moriconi | G06F 21/552 713/189 |
| 8,214,880 | B1* | 7/2012 | Wu | H04L 63/0876 379/15.03 |
| 2003/0087629 | A1* | 5/2003 | Juitt | H04L 1/22 455/411 |

(Continued)

*Primary Examiner* — Tongoc Tran
(74) *Attorney, Agent, or Firm* — Jackson Walker L.L.P.

(57) ABSTRACT

In accordance with embodiments of the present disclosure, a method may include: (i) retrieving a profile from a management controller of an information handling system, the management controller configured to provide management of the information handling system via management traffic communicated between the management controller and a dedicated management network external to the information handling system, and the profile including data regarding a configuration of the management controller; (ii) comparing the profile to one or more golden profiles to determine whether security of the management controller has been compromised; (iii) responsive to the profile matching a golden profile of the one or more golden profiles, permitting the management controller to continue execution; and (iv) responsive to the profile failing to match a golden profile of the one or more golden profiles, taking remedial action with respect to the management controller.

18 Claims, 2 Drawing Sheets

(56) References Cited

U.S. PATENT DOCUMENTS

| | | | |
|---|---|---|---|
| 2006/0198358 A1* | 9/2006 | Beckwith | H04L 41/0803 370/351 |
| 2006/0200856 A1* | 9/2006 | Salowey | H04L 9/32 726/5 |
| 2007/0028109 A1* | 2/2007 | Wysocki | G06Q 20/3678 713/176 |
| 2007/0226377 A1* | 9/2007 | Jreij | G06F 13/385 710/8 |
| 2007/0235517 A1* | 10/2007 | O'Connor | G06Q 10/06 235/375 |
| 2009/0282261 A1* | 11/2009 | Khan | G06F 21/72 713/189 |
| 2010/0049855 A1* | 2/2010 | Stewart | H04L 12/14 709/227 |
| 2011/0040917 A1* | 2/2011 | Lambert | H04L 69/18 710/301 |
| 2011/0113474 A1* | 5/2011 | Chandolu | G06F 21/6218 726/4 |
| 2011/0173685 A1* | 7/2011 | Chai | H04L 41/0806 726/6 |
| 2012/0084420 A1* | 4/2012 | Ayanam | H04L 12/6418 709/223 |
| 2013/0263205 A1* | 10/2013 | Jacobs | G06F 21/57 726/1 |
| 2014/0310510 A1* | 10/2014 | Potlapally | G06F 9/4401 713/2 |
| 2017/0093623 A1* | 3/2017 | Zheng | H04L 9/32 |
| 2017/0098094 A1* | 4/2017 | Winslow | G06F 21/6218 |
| 2018/0173515 A1* | 6/2018 | Goltz | G06F 8/65 |

* cited by examiner

SYSTEMS AND METHODS FOR MANAGEMENT DOMAIN ATTESTATION SERVICE

TECHNICAL FIELD

The present disclosure relates in general to information handling systems, and more particularly to methods and systems for enabling storage of administrator secrets in a management controller-owned cryptoprocessor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include management controllers for out of band management of information handling systems. However, in existing approaches, a management controller with compromised security is not prevented from connecting to a network and/or management services.

SUMMARY

In accordance with the teachings of the present disclosure, the disadvantages and problems associated with existing approaches for protecting from security compromised management controllers may be reduced or eliminated.

In accordance with these and other embodiments of the present disclosure, an information handling system may include a processor and a program of instructions embodied in non-transitory computer-readable media, the program of instructions configured to, when executed by the processor: (i) retrieve a profile from a management controller of a second information handling system, the management controller configured to provide management of the second information handling system via management traffic communicated between the management controller and a dedicated management network external to the information handling system, and the profile including data regarding a configuration of the management controller; (ii) compare the profile to one or more golden profiles to determine whether security of the management controller has been compromised; (iii) responsive to the profile matching a golden profile of the one or more golden profiles, permit the management controller to continue execution; and (iv) responsive to the profile failing to match a golden profile of the one or more golden profiles, take remedial action with respect to the management controller.

In accordance with these and other embodiments of the present disclosure, a method may include: (i) retrieving a profile from a management controller of an information handling system, the management controller configured to provide management of the information handling system via management traffic communicated between the management controller and a dedicated management network external to the information handling system, and the profile including data regarding a configuration of the management controller; (ii) comparing the profile to one or more golden profiles to determine whether security of the management controller has been compromised; (iii) responsive to the profile matching a golden profile of the one or more golden profiles, permitting the management controller to continue execution; and (iv) responsive to the profile failing to match a golden profile of the one or more golden profiles, taking remedial action with respect to the management controller.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to: (i) retrieve a profile from a management controller of an information handling system, the management controller configured to provide management of the information handling system via management traffic communicated between the management controller and a dedicated management network external to the information handling system, and the profile including data regarding a configuration of the management controller; (ii) compare the profile to one or more golden profiles to determine whether security of the management controller has been compromised; (iii) responsive to the profile matching a golden profile of the one or more golden profiles, permit the management controller to continue execution; and (iv) responsive to the profile failing to match a golden profile of the one or more golden profiles, take remedial action with respect to the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
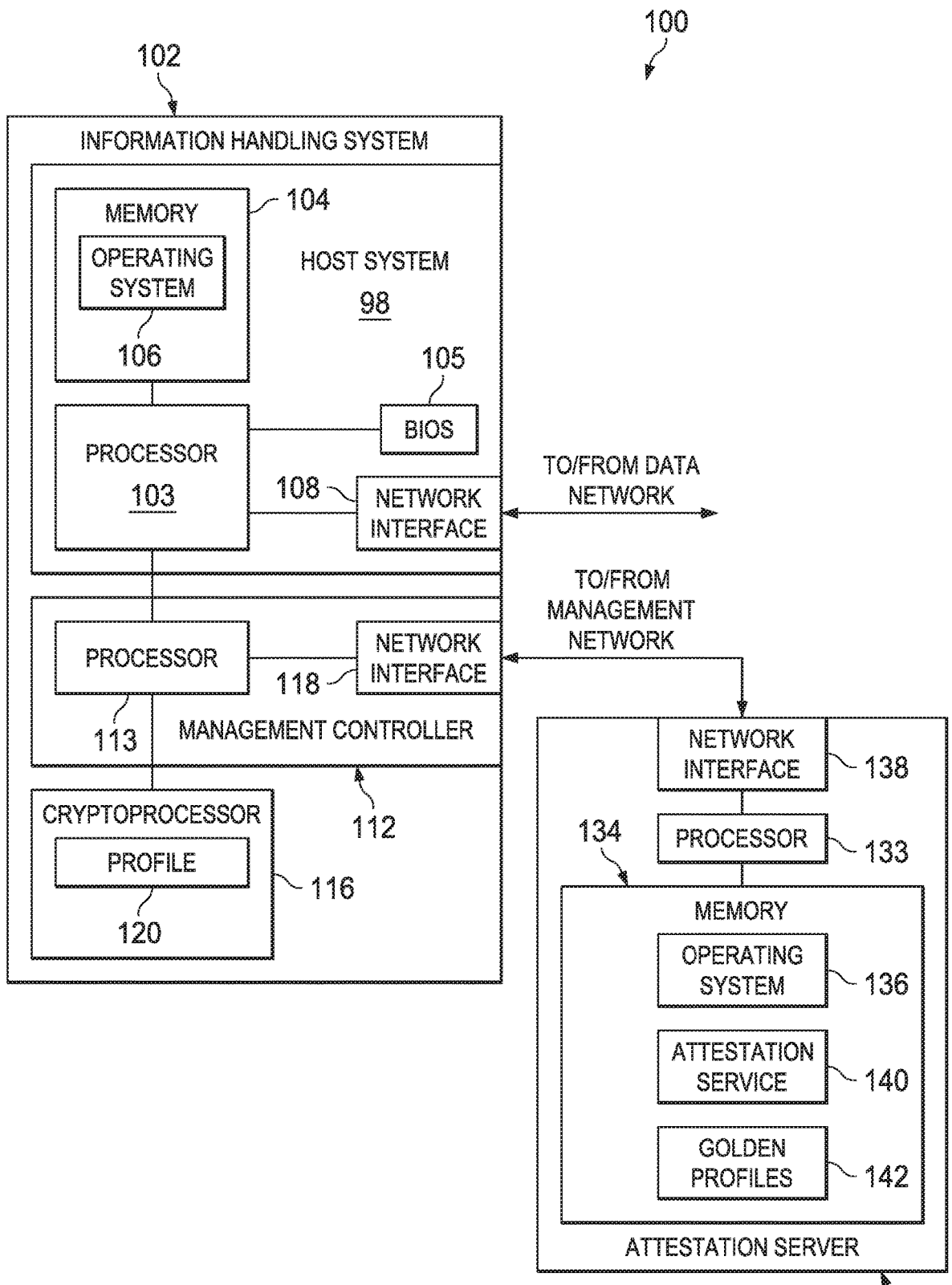
FIG. 1 illustrates a block diagram of an example system for management domain attestation, in accordance with embodiments of the present disclosure.
Figure 2:
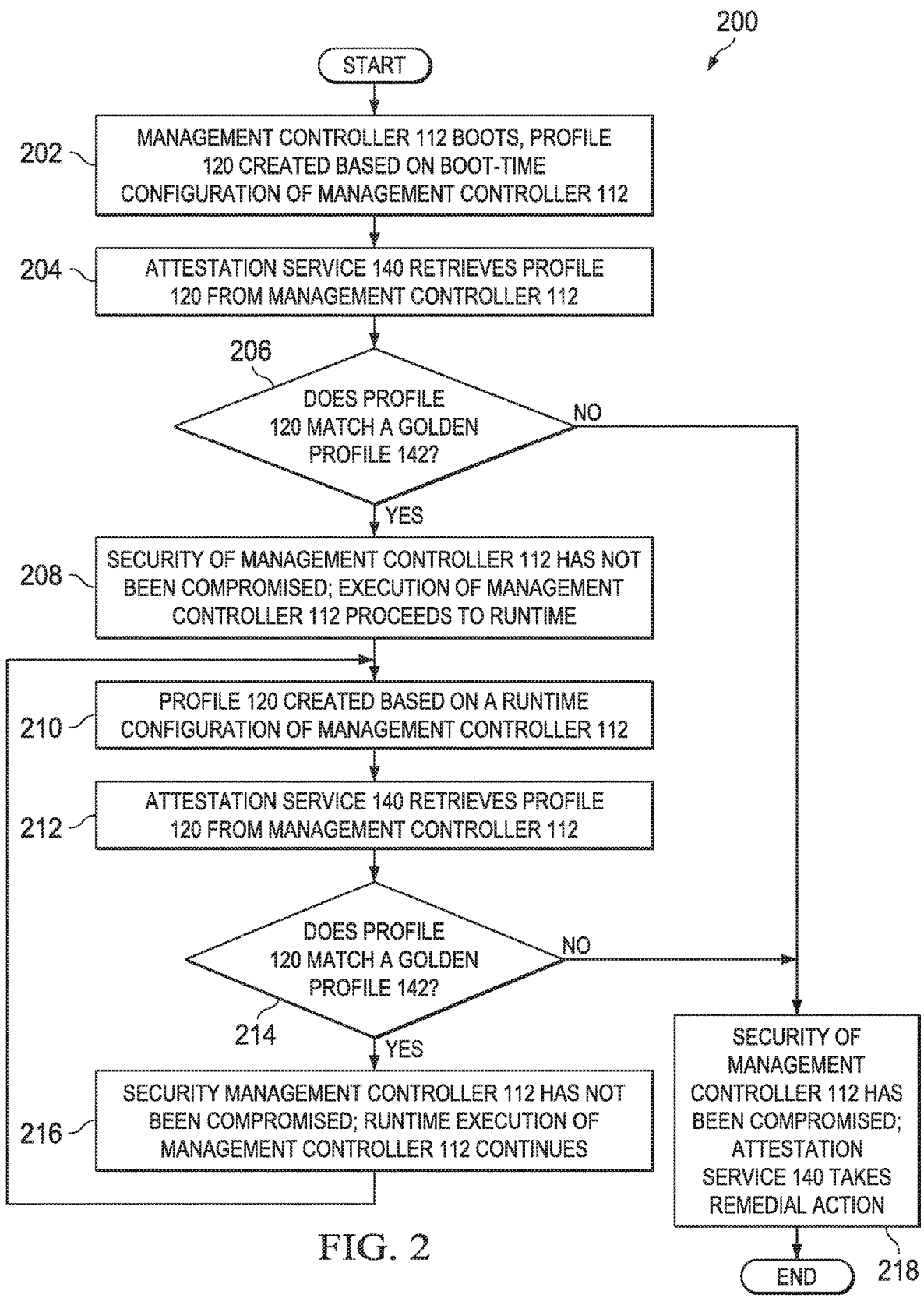
FIG. 2 illustrates a flowchart of an example method for management domain attestation, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for management domain attestation, in accordance with embodiments of the present disclosure. As shown in FIG. 1, system 100 may include an information handling system 102 and an attestation server 132 communicatively coupled to information handling system 102.

In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a management controller 112 communicatively coupled to processor 103, and a crypto-processor 116 communicatively coupled to a processor 113.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Cryptoprocessor 116 may be communicatively coupled to processor 113 (e.g., via an I2C bus) and may include any system, device, or apparatus configured to carry out cryptographic operations on data communicated to it from processor 113 and/or another component of management controller 112. Thus, cryptoprocessor 116 may be dedicated to management controller 112. In some embodiments, cryptoprocessor 116 may be compliant with the Trusted Platform Module (TPM) specification, a successor specification, and/or any other similar specification. In some embodiments, cryptoprocessor 116 may be configured to generate random numbers, generate encryption keys (e.g., RSA keys), generate and maintain hash key tables of hardware and software components associated with management controller 112, generate and maintain configuration parameters associated with hardware and software components of management controller 112, wrap (e.g., encrypt) keys, unwrap (e.g., decrypt) keys and/or store keys (e.g., endorsement key, storage root key, attestation identity keys, storage keys).

In some embodiments, cryptoprocessor 116 may comprise a non-volatile memory accessible only to or by cryptoprocessor 116. As shown in FIG. 1, such non-volatile memory may store profile 120. Profile 120 may include information regarding a configuration of management controller 112. In some embodiments, such information may include information that would be difficult for an interloper to mimic without expending significant amounts of time and/or resources. For example, profile 120 may include static data which has unique and unchanging values for management controller 112, such as program code (e.g., bootblock, uboot, LINUX) associated with management controller 112. As another example, profile 120 may include information regarding a run-time configuration of management controller 112 (e.g., values stored in certain registers and/or certain memory locations associated with management controller 112 during run-time execution of management controller 112). In these and other embodiments, profile 120 may build on a software core root of trust provided by cryptoprocessor 116 by storing values of platform configuration registers (PCRs) and/or other data registers present at the time profile 120 is created. In addition to profile 120 being embodied by PCRs of cryptoprocessor 116, in some embodiments, profile 120 may be extended to PCRs other than those present in cryptoprocessor 116. Accordingly, profile 120 may serve as a measurement of executable code of management controller 112, data of management controller 112, particular software components of management controller 112, and/or any other parameter regarding the configuration of management controller 112.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC."

In addition to processor 103, memory 104, network interface 108, management controller 112, and cryptoprocessor 116, information handling system 102 may include one or more other information handling resources.

Attestation server 132 may comprise an information handling system. As depicted in FIG. 1, attestation server 132 may include a processor 133, a memory 134 communicatively coupled to processor 133, and a network interface 138 communicatively coupled to processor 133.

Processor 133 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 133 may interpret and/or execute program instructions and/or process data stored in memory 134 and/or another component of attestation server 132.

Memory 134 may be communicatively coupled to processor 133 and may include any system, device, or apparatus configured to retain program instructions and/or data for a period of time (e.g., computer-readable media). Memory 134 may include RAM, EEPROM, a PCMCIA card, flash memory, magnetic storage, opto-magnetic storage, or any suitable selection and/or array of volatile or non-volatile memory that retains data after power to information handling system 132 is turned off.

As shown in FIG. 1, memory 134 may have stored thereon an operating system 136, attestation service 140, and golden profiles 142. Operating system 136 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 136. In addition, operating system 136 may include all or a portion of a network stack for network communication via a network interface (e.g., network interface 138 for communication over a data network). Active portions of operating system 136 may be transferred to memory 134 for execution by processor 133. Although operating system 136 is shown in FIG. 1 as stored in memory 134, in some embodiments operating system 136 may be stored in storage media accessible to processor 133, and active portions of operating system 136 may be transferred from such storage media to memory 134 for execution by processor 133.

Attestation service 140 may comprise any program of executable instructions, or aggregation of programs of executable instructions, configured to perform functionality with respect to remote attestation of management controller 112, as described in greater detail elsewhere in this disclosure. Active portions of attestation service 140 may be transferred to memory 134 for execution by processor 133. Although attestation service 140 is shown in FIG. 1 as stored in memory 134, in some embodiments attestation service 140 may be stored in storage media accessible to processor 133, and active portions of attestation service 140 may be transferred from such storage media to memory 134 for execution by processor 133.

Golden profiles 142 may include a list, map, table, or other data structure setting forth one or more approved or white-listed profiles which may be utilized by attestation service 136 to compare a profile 120 associated with a management controller 112 to one or more golden profiles 142 in order to attest to the veracity of a profile 120 in order to determine if security of a management controller 112 has been compromised, as described in greater detail elsewhere in this disclosure.

Network interface 138 may comprise any suitable system, apparatus, or device operable to serve as an interface between attestation server 132 and management controller 112 of information handling system 102 via an out-of-band management network coupling network interface 118 of management controller 112 to network interface 138 of attestation server 132. Network interface 138 may enable information handling system 102 to communicate using any suitable transmission protocol and/or standard. In these and other embodiments, network interface 138 may comprise a network interface card, or "NIC." In these and other embodiments, network interface 138 may be enabled as a local area network (LAN)-on-motherboard (LOM) card.

In addition to processor 133, memory 134, and network interface 138, attestation server 132 may include one or more other information handling resources.

Although FIG. 1 depicts system 100 as having one information handling system 102 for purposes of clarity and exposition, in some embodiments, system 100 may include a plurality of information handling systems 102 having management controllers 112 thereof communicatively coupled to attestation server 132 via the management network.

In operation, attestation service 140 may retrieve profile 120 from information handling system 102, essentially measuring a configuration of management controller 112 of information handling system 102. In alternative embodiments, information handling system 102 and/or management controller may "push" profile 120 to attestation service 120 (e.g., such push is expected to occur during a defined time period to be trusted). Such profile may be retrieved via a suitable remote management application programming interface (API) between management controller 112 and attestation service 140 (e.g., Web Service Management or "WSMAN" API; Remote Access Controller Admin API; etc.). After retrieval, attestation service 140 may compare such profile 120 to one or more golden profiles 142. If profile 120 matches with a golden profile 142, attestation service 140 may thus determine that the security of management controller 112 has not been compromised. On the other hand, if profile 120 does not match to a golden profile 142, attestation service 140 may determine that the security of management controller 112 has been compromised, and take remedial action. In some embodiments, such remedial action may include segregating management controllers 112 that have been compromised into an untrusted zone (e.g., a segregated subnet of a software-defined networking controller), thus allowing attestation service 140 (which may execute in connection with or as part of a software-defined networking controller) to build lists of trusted management controllers 112 and untrusted management controllers. In addition, such remedial action may include segregation of host systems 98 of information handling systems 102 having compromised management controllers 112 into untrusted zones on the in-band data network, as compromise of a management controller 112 of an information handling system 102 may indicate compromise of the entire information handling system 102.

In some embodiments, attestation service 140 may be configured to perform attestation of management controller 112 at different points of execution of management controller 112. For example, in some embodiments, attestation service 140 may retrieve profile 120 and perform attestation at an initial boot of management controller 112 (e.g., compare profile 120 to a particular boot-time profile of golden profiles 142) and may at some later time, retrieve profile 120 and perform attestation during runtime (e.g., during execution of operating system 136) of management controller 112 (e.g., compare profile 120 to a particular runtime profile of golden profiles 142).

To prevent spoofing of the exposed profile 120 of cryptoprocessor 116 (e.g., faked by malicious code gaining access to management controller 112), a module of management controller 112 or cryptoprocessor 116 that communicates with the API of attestation service 140 to provide profile 120 may be embodied in read-only memory or other unchangeable code. For example, such module could include a private key of a public-private key pair, which is used to sign profile 120 and any other information retrieved by attestation service 140 in response to a request for profile 120. Attestation service 140 could then apply a public key of the public/private key pair to validate the private key signature of profile 120, and attest to the veracity of profile 120 if and only if the private key signature is validated and profile 120 matches a golden profile 142. In such embodiments, the architecture may be such that the private key is not easily discoverable (e.g., contained within a usable but user non-readable portion storage medium of management controller or cryptoprocessor 114).

FIG. 2 illustrates a flowchart of an example method 200 for management domain attestation, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may begin boot, and profile 120 may be created based on a boot-time configuration of management controller 112. At step 204, attestation service 140 may retrieve profile 120 from management controller 112, as described above (e.g., including authentication of profile 120).

At step 206, after retrieval, attestation service 140 may compare profile 120 to one or more golden profiles 142. If profile 120 matches with a golden profile 142, method 200 may proceed to step 208, otherwise, method 200 may proceed to step 218.

At step 208, in response to profile 120 matching with a golden profile 142, attestation service 140 may determine that the security of management controller 112 has not been compromised, and execution of management controller 112 may proceed to runtime. At step 210, during runtime of management controller 112, profile 120 may be created based on a runtime configuration of management controller 112. At step 212, attestation service 140 may retrieve profile 120 from management controller 112, as described above.

At step 214, after retrieval, attestation service 140 may compare profile 120 to one or more golden profiles 142. If profile 120 matches with a golden profile 142, method 200 may proceed to step 216, otherwise, method 200 may proceed to step 218.

At step 216, in response to profile 120 matching with a golden profile 142, attestation service 140 determine that the security of management controller 112 has not been compromised, and execution of management controller 112 may continue. After completion of step 216, method 200 may proceed again to step 210, and runtime attestation of management controller 112 may be repeated multiple times during runtime.

At step 218, in response to profile 120 not matching to a golden profile 142, attestation service 140 may determine that the security of management controller 112 has been compromised, and take one or more remedial actions, as described above (e.g., segregating compromised management controllers 112 that have been compromised into an untrusted zone and/or segregating host systems 98 of information handling system 102 having compromised management controllers 112 into untrusted zones). After step 218, method 200 may end with respect to the compromised management controller, although method 200 may continue execution for other non-compromised management controllers.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a program of instructions embodied in non-transitory computer-readable media, the program of instructions configured to, when executed by the processor:
   retrieve a profile from a management controller of a second information handling system, the management controller configured to provide out-of-band management of the second information handling system via management traffic communicated between the management controller and a dedicated management network external to the second information handling system, the out-of-band management including management of the second information handling system when the second information handling system is in a powered-off state, and the profile including data regarding a configuration of the management controller, wherein the profile includes data regarding a runtime configuration of the management controller, the data including at least one value that was stored in a selected memory location of the management controller during runtime execution of the management controller;
   compare the profile to one or more golden profiles to determine whether security of the management controller has been compromised;
   responsive to the profile matching a golden profile of the one or more golden profiles, permit the management controller to continue execution; and
   responsive to the profile failing to match a golden profile of the one or more golden profiles, take remedial action with respect to the management controller.

2. The information handling system of claim 1, wherein the profile is embodied in a platform control register associated with a cryptoprocessor associated with the management controller.

3. The information handling system of claim 1, wherein the profile is encrypted by a private key of a public/private key pair, and the program of instructions is further configured to decrypt the profile with a public key of the public/private key pair to validate the profile before comparison to the one or more golden profiles.

4. The information handling system of claim 1, wherein the profile further includes data regarding a boot-time configuration of the management controller.

5. The information handling system of claim 1, wherein the remedial action comprises segregating the management controller into an untrusted subnet of the dedicated management network.

6. The information handling system of claim 5, wherein the remedial action further comprises segregating a host system of the second information handling system into an untrusted subnet of a data network coupled to the host system.

7. A method comprising:
retrieving a profile from a management controller of an information handling system, the management controller configured to provide out-of-band management of the information handling system via management traffic communicated between the management controller and a dedicated management network external to the information handling system, the out-of-band management including management of the information handling system when the information handling system is in a powered-off state, and the profile including data regarding a configuration of the management controller, wherein the profile includes data regarding a runtime configuration of the management controller, the data including at least one value that was stored in a selected memory location of the management controller during runtime execution of the management controller;
comparing the profile to one or more golden profiles to determine whether security of the management controller has been compromised;
responsive to the profile matching a golden profile of the one or more golden profiles, permitting the management controller to continue execution; and
responsive to the profile failing to match a golden profile of the one or more golden profiles, taking remedial action with respect to the management controller.

8. The method of claim 7, wherein the profile is embodied in a platform control register associated with a cryptoprocessor associated with the management controller.

9. The method of claim 7, wherein the profile is encrypted by a private key of a public/private key pair, and the method further comprises decrypting the profile with a public key of the public/private key pair to validate the profile before comparison to the one or more golden profiles.

10. The method of claim 7, wherein the profile further includes data regarding a boot-time configuration of the management controller.

11. The method of claim 7, wherein the remedial action comprises segregating the management controller into an untrusted subnet of the dedicated management network.

12. The method of claim 11, wherein the remedial action further comprises segregating a host system of the information handling system into an untrusted subnet of a data network coupled to the host system.

13. An article of manufacture comprising:
a non-transitory computer-readable medium; and
computer-executable instructions carried on the computer-readable medium, the instructions readable by a processor, the instructions, when read and executed, for causing the processor to:
retrieve a profile from a management controller of an information handling system, the management controller configured to provide out-of-band management of the information handling system via management traffic communicated between the management controller and a dedicated management network external to the information handling system, the out-of-band management including management of the information handling system when the information handling system is in a powered-off state, and the profile including data regarding a configuration of the management controller, wherein the profile includes data regarding a runtime configuration of the management controller, the data including at least one value that was stored in a selected memory location of the management controller during runtime execution of the management controller;
compare the profile to one or more golden profiles to determine whether security of the management controller has been compromised;
responsive to the profile matching a golden profile of the one or more golden profiles, permit the management controller to continue execution; and
responsive to the profile failing to match a golden profile of the one or more golden profiles, take remedial action with respect to the management controller.

14. The article of claim 13, wherein the profile is embodied in a platform control register associated with a cryptoprocessor associated with the management controller.

15. The article of claim 13, wherein the profile is encrypted by a private key of a public/private key pair, and the instructions further cause the processor to decrypt the profile with a public key of the public/private key pair to validate the profile before comparison to the one or more golden profiles.

16. The article of claim 13, wherein the profile further includes data regarding a boot-time configuration of the management controller.

17. The article of claim 13, wherein the remedial action comprises segregating the management controller into an untrusted subnet of the dedicated management network.

18. The article of claim 17, wherein the remedial action further comprises segregating a host system of the information handling system into an untrusted subnet of a data network coupled to the host system.

* * * * *